(12) United States Patent
Ho (10) Patent No.: US 6,922,747 B2
(45) Date of Patent: Jul. 26, 2005

(54) COMMUNICATION SYSTEM AND METHODOLOGY FOR ADDRESSING AND SENDING DATA OF DISSIMILAR TYPE AND SIZE ACROSS CHANNELS FORMED WITHIN A LOCALLY SYNCHRONIZED BUS

(75) Inventor: Horace C. Ho, Austin, TX (US)

(73) Assignee: Oasis Silicon Systems, Inc., Austin, TX (US)

( * ) Notice: Subject to any disclaimer, the term of this patent is extended or adjusted under 35 U.S.C. 154(b) by 421 days.

(21) Appl. No.: 10/157,097

(22) Filed: May 29, 2002

(65) Prior Publication Data

US 2003/0225953 A1 Dec. 4, 2003

(51) Int. Cl.[7] .............................................. G06F 13/00
(52) U.S. Cl. .......................... 710/305; 710/30; 710/32; 710/33; 710/34; 370/470; 370/472
(58) Field of Search .......................... 710/305, 29, 30, 710/32, 33, 34, 58, 60, 61; 370/470, 472; 713/400, 501

(56) References Cited

U.S. PATENT DOCUMENTS

| | | | |
|---|---|---|---|
| 4,593,282 A | 6/1986 | Acampora et al. | |
| 4,637,014 A | 1/1987 | Bell et al. | |
| 5,550,802 A | 8/1996 | Worsley et al. | |
| 6,085,270 A | 7/2000 | Gulick | |
| 6,088,810 A | * 7/2000 | Ribes et al. | ................. 713/400 |

FOREIGN PATENT DOCUMENTS

| | | |
|---|---|---|
| EP | 0 178 205 | 4/1986 |
| EP | 0 883 263 | 12/1998 |
| WO | 02/13461 | 2/2002 |

OTHER PUBLICATIONS

International Search Report, application no. PCT/US03/16601, mailed Feb. 25, 2004.

* cited by examiner

Primary Examiner—Glenn A. Auve
(74) Attorney, Agent, or Firm—Kevin L. Daffer; Daffer McDaniel, LLP (57) ABSTRACT

A communication system, network interface and communication port is provided that includes a media local bus. The local bus is connected between a controller and one or more multimedia devices located within a node of the communication system. The controller periodically broadcasts addressing signals to the source devices to synchronize data transmission from those devices according to those addresses. Source devices will thereafter transmit a command which signifies the type of data being transmitted from that source device within the address channel. The channel is maintained and data is transmitted until the next address is sent from the controller. Each channel can be set up in a customized fashion to add flexibility in channel length and data types being transferred throughout the local bus without having to assign fixed and regimented time slots for those data types and for each device connected to the local bus.

25 Claims, 9 Drawing Sheets

| CH ADR. | SOURCE / DEST |
|---------|---------------|
| A | CNT / DEV0 |
| B | DEV1 / DEV2 |
| C | DEV0 / DEV1 |
| . | . |
| . | . |
| . | . |

*FIG. 13*

ADDRESS

OXFF - 255   SYNC
OXFE - 254
              ⎫
              ⎬ RES
              ⎭
OX80 - 128
OX7F - 127
              ⎫
              ⎬ CH ADR.
              ⎭
OX01 - 1
OX00 -        RES

COMMAND

OXFF - 255
              ⎫
              ⎬ RES
              ⎭
OX80 - 128
OX7F - 127    ERROR
OX7E - 126    RESET
OX7D - 125    ECHO
OX7C         ⎫
OX0A         ⎬ RES
OX09    CON  CNTL   PK
OX08    ST   CNTL   PK
OX07    CON  PKT    PK
OX06    ST   PKT    PK
OX05    CON  ISO    PK
OX04    ST   ISO    PK
OX03    CON  SYC    PK
OX02    ST   SYC    PK
OX01         RES
OX00         NO DATA

*FIG. 14*

COMMUNICATION SYSTEM AND METHODOLOGY FOR ADDRESSING AND SENDING DATA OF DISSIMILAR TYPE AND SIZE ACROSS CHANNELS FORMED WITHIN A LOCALLY SYNCHRONIZED BUS

BACKGROUND OF THE INVENTION

1. Field of the Invention

This invention relates to a communication system, and more particularly to channels that are addressable within a bus shared between a group of multimedia devices locally connected to the bus and communicable to a network external to the local bus. Each channel has an associated source device and destination device, with the channel length set upon the arrival of a subsequent address. The type of data forwarded across each channel is specified by a command signal forwarded contemporaneous with the data and synchronous with the data, yet sent on a conductor separate from the data forwarded across one or more data conductors.

2. Description of the Related Art

Communication systems are generally well-known as containing at least two nodes interconnected by a transmission line. A node can function as a data source or destination. If the node is to receive and transmit data, then the node is a combination of a source and destination, and is sometimes known as a transceiver. The data source can transmit data in various forms. For example, the source can transmit in either an analog or digital domain. Typically, however, an analog signal is converted to a digital format before being transmitted across the transmission line to the destination.

It is generally desirable that the transmission line accommodate not only digital or analog data, but also data that can arrive in different forms, hereinafter known as "data types." For example, sophisticated transmission protocols can accommodate streaming data, packetized data, and control data. Streaming data is generally recognized as data that has a temporal relationship between samples produced from a node. The relationship between those samples must be maintained across the transmission line to prevent perceptible errors, such as gaps or altered frequencies. A loss in the temporal relationship can cause a receiver to present jitter, echo or, in the worst instance, periodic blanks in a voice or video stream. Converse to streaming data, packetized data is data which need not maintain the sample rate or temporal relationship of that data and, instead, can be sent as disjointed bursts across a transmission line. The packets of data can be sent across the transmission line at virtually any rate at which that transmission line transfers data and is not dependent in any fashion on any sampling frequency since packetized data is generally recognized as non-sampled data.

In addition to streaming data and packetized data, another type of data can be control data. Depending on how the control data is used (either in a streaming or packetized environment), control data may be either time dependent or non-time dependent on the data or node in which it controls. Moreover, streaming data can be considered as either synchronous data or isochronous data. Synchronous forms of streaming data is data sent across the transmission line in sync with the rate by which the streaming data is sampled. However, it may be that the transmission line transfers data at a different rate than the rate at which the node streams, or "samples," data. In order to maintain the temporal relationship between samples of the streaming data, isochronous transfer protocols are needed to accommodate those differences in order for the isochronous data to be played at the destination without perceptible gaps, errors, jitter or echo.

An optimal transmission line can transfer different types of data. Coupled to the transmission line, which can be either copper wire, optical fiber, or wireless, are multiple nodes. Each node can accommodate at least one multimedia device. For example, a telephone multimedia device can be used to send and receive voice information and, depending on differences in sampling rate (i.e., "fs") at the telephone and the frame transfer rate (i.e., "FSY") within the transmission line, the voice information can be either sent as isochronous data or synchronous data. Depending on the relationship between the frame sync rate (FSY) and the sampling rate (fs), streaming data can be presented to the transmission line as either synchronous data or isochronous data. In any instance, control information can be sent to the multimedia device to set up the transmission or to control the receipt of the streaming (isochronous or synchronous) data. In addition to transmitting streaming and control data, the transmission line should also be able to transmit packet information between computers. Packetized data includes executable programs and/or files sent as bursts of digital data across the transmission line.

Multimedia devices operating as sources can therefore produce not only different types of data in different forms, but also data that will arrive at the transmission line at different rates. For example, a voice from a telephone handset is a continuous stream of data having a substantially constant average data rate and a temporal relationship between the samples produced. The isochronous or synchronous forms of streaming data can, therefore, represent sounds (in the example of a telephone or CD player) or images (in the example of DVD player). While telephones, CD players and DVD players send isochronous or synchronous streaming data across a network, a computer sends bursts of packets such as in TCP/IP form across the network.

A communication system is needed that can accommodate both streaming and non-streaming data transfers between nodes of the communication system. More importantly, it is desirable that all forms of streaming data be accommodated, including synchronous streaming data and isochronous streaming data. Therefore, the desired transmission protocol should be particularly attuned to communication between multimedia devices that send data and receive data in whatever form data is needed to communicate information. It is further desirable that the communication system have intelligent nodes. That is, each node should be set up to accommodate one or more multimedia devices, where communication across the network is established within the intelligence of a controller possibly contained within each node. In this fashion, the desired communication system allows the intelligent controller to perform a significant portion of all transfer protocol operations across the network as well as between multimedia devices within a node connected via the controller, or network interface, to the network. In this fashion, an improvement can exist which will allow conventional multimedia devices to be easily added and the network to be easily scaled to the added devices without having to change or modify either the network or the devices.

SUMMARY OF THE INVENTION

The problems outlined above are in large part solved by an improved communication system hereof. The communication system involves not only the network that extends between nodes, but can also include a local bus within a node. The local bus can connect one or more multimedia devices to a controller within a node. The controller preferably operates as a network interface and connects the network to the local bus to allow communication between any of such devices connected to the local bus not only to one another, but also to other multimedia devices contained in other nodes.

A feature of the local bus is the network interface comprising a controller. The controller serves many functions, one of which is to establish an address and data transfer protocol. Channels are addressed and data is sent within corresponding channels. Commands are used to designate the type of data sent within each channel, as well as data timing. Preferably, if numerous types of data are needed, and the data type is streaming data, then streaming data is sent during each frame. The address notes the source and destination for a corresponding channel, and the duration between subsequent pairs of addresses note the number of bytes available for that channel. The addresses are sent by the controller, and the transmitting source device (which can include the controller) sends commands as well as data. If more than one device is connected to the controller via the local bus, and the local bus is a bus topology, then the signal output and data output pins must be tri-stated at the end of their transmission.

To accommodate different types of data, the network interface or, more specifically, a controller within the network interface sets up the addressing protocol and the source device sets up transmission of the different types of data emanating from the source. Thus, the controller establishes channels across which various types of data can be sent. The controller not only presents various types of data within a single frame upon the network, but also receives the various types of data from the network and distributes that data to corresponding devices connected to a local bus. Knowing when to send and receive data and coordinating the data transfer protocol takes place primarily within the controller of the network interface. This ensures that streaming data is sent within a frame and, therefore, will be compiled as a continuous and substantially regular data at the destination at essentially the same rate at which it was sampled at the source, as well as to ensure up to four types of data will be distributed to the appropriate devices that receive such data.

The controller preferably sends multiple addresses within a single frame when called upon to disseminate data across the local bus originating from the network or vice-versa. Data attributed to a first address will be sent when a command signal is sent and the duration of that data transfer will be dictated by the duration between a subsequent pair of addresses. The command signal is preferably a byte which signifies the type of data established by the preceding address. Thus, the first address attributable to the command (i.e., the first address connotes an address preceding the subsequent pair of addresses) will note that a channel is formed by addressing a source and a destination from among a plurality of multimedia devices (including the controller) connected to the local bus. Once the first address is presented from the controller and broadcast to each of the multimedia devices, the source multimedia device will prepare itself for transferring data when it sees its transmit channel address appear. The source device will also send a command indicating the type of data being transmitted. Preferably, the amount of pipeline delay is known and is equal to the minimum channel length, or multiples of the minimum channel length if the preceding channel is longer than other channels.

According to one embodiment, a communication port is provided. The communication port can be found within the network interface and/or on within one or more multimedia devices, and comprises a data pin and a signal pin. According to the data transfer protocol established by the port, a plurality of addresses are established, each of which specifies a unique channel. The channel is unique in that a source and destination device is specified for that channel in order to transfer data across that channel from one device to another device linked to the local bus. The number of bytes between a pair of addresses specifies the data transfer byte length, or channel length, for a previously addressed channel. Thus, the channel is addressed and, thereafter, another pair of addresses occur on a single, signal conductor. The first address is preferably attributed to a channel separate and apart from the second pair of addresses each of which address another pair of channels. If the minimum channel length is 2 bytes, then the first address prior to the pair of addresses is 2 bytes prior to the first one of the pair of addresses. In many instances, the minimum channel length is greater than 2 bytes, and can be 4 bytes or more.

According to another embodiment, a network interface is provided. The network interface includes a clock pin, a signal pin, and a data pin. The signal pin is adapted to send a first address, followed by a second address, and followed by a third address. The data pin is adapted to send data from a source to a destination designated by the first address for a time duration between when the signal pin sends the second address and the third address. Preferably, the time duration occurs after the second address ends and before the third address begins. The clock pin can send the clock such that the first address, the second address, third address, and data are synchronized to the clock. Thus, the time duration can begin at a cycle of the clock immediately after the second address ends and at a cycle of the clock immediately before the third address begins.

According to yet another embodiment, a method is provided. The method includes the transmission of information, beginning with transmitting a first address, followed by transmitting a second address. Thereafter, data is transmitted from a source to a destination specified by the first address. A third address is then transmitted whereupon transmission of the data is terminated.

BRIEF DESCRIPTION OF THE DRAWING

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
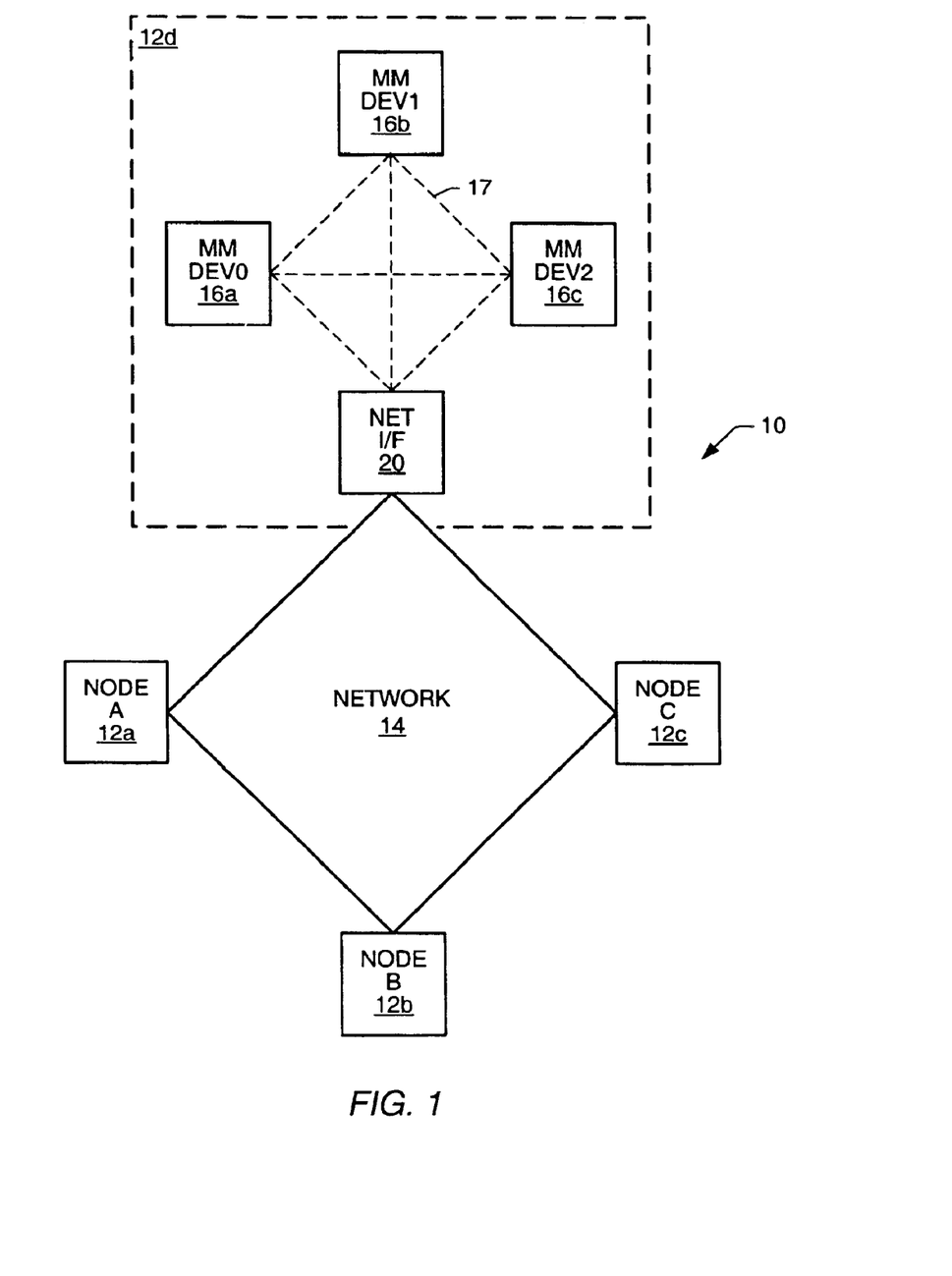
FIG. 1 is a block diagram of a communication system of interconnected nodes (network), where one or more of the nodes can accommodate a controller and one or more multimedia devices interconnected by a local bus synchronized to a clocking signal sent from, for example, the network.

Turning now to the drawings, FIG. 1 illustrates one example of a communication system 10. Communication system 10 includes an interconnected plurality of nodes 12. For sake of brevity, only four nodes are shown. However, it is understood that system 10 can include more than four nodes and can also include multiple interconnected networks. The network shown in FIG. 1 is a ring or loop. However, it is also understood that the network backbone can be bus, star, or any other topology available to a network. Coupled between nodes 12 are corresponding transmission links 14. Transmission links 14 can be optical, acoustic, or electrical (wired or wireless).

Each node 12 is preferably localized to a particular area. Within each node is at least one multimedia device. As shown in node 12d, a node can have more than one multimedia device 16. A local transmission line or local bus is shown connected between multimedia devices 16 in either a loop or bus topology as shown by the alternative phantom lines 17.

Connected between the network of interconnected nodes and local bus 17 of a particular node is a network interface 20. Interface 20 includes a communication port for transmitting communication between transmission lines 14 and local bus 17. The communication port can also be found within each of the multimedia devices 16 and, depending on its configuration, includes a clock pin, one or two signal pins, and at least one (or at least one pair of) data pins. As will be appreciated herein, the network interface function can be placed within one or more multimedia device 16 or the network interface can be separate from the multimedia devices. A multimedia device 16 can be found on a single monolithic substrate and the network interface can also be on a single monolithic substrate. Thus, the communication port can be found on, for example, a monolithic substrate of a network interface or on a monolithic substrate of a multimedia device that may or may not contain the network interface.

Preferably, network interface 20 includes a digital signal processor or controller that can be programmed, and can include a memory medium operably linked to the execution unit of the processor. Multimedia device 16, one or more of which are found within a node, is any device that can send and/or receive multimedia signals. Such signals include voice, audio, video, data files, or executable data programs. Examples of such devices include telephones, sensors, CD players, DVD players, video cameras, speakers, monitors, computers, personal digital assistants (PDAs), frequency modulated stereos, navigational systems, etc.

According to one example, the multimedia devices can be located within an automobile, and the communication system is employed within the automobile for linking the multimedia devices within a node 12 to one another or to multimedia devices within another automobile, a satellite, or a stationary base station. Depending on whether data is encrypted or encoded at the multimedia device, communication system 10 allows transfer of such information to the target as either streaming data (synchronous or isochronous), control data, or asynchronous (packetized) data. In addition, communication system 10 can allow transfer of all four types of data across one or more channels established within communication line 14 or across local bus 17. Communication system therefore accommodates the different types of data in order to add versatility to the various types of multimedia devices which can be used.

It is recognized that one or more multimedia devices can sample data at a higher sampling rate (fs) than the frame sync rate (FSY) of transmission line 14. For example, multimedia device 16 may be a CD player than samples at approximately 44.1 KHz. The CD player can stream data at, for example, 16 bits per audio channel (32 bits per stereo channel) per sample clock period, therefore resulting in a bps Baud rate across the transmission line of 32 bits/stereo sample×44.1 k samples/second=1.4112 Mbps. The non-return to zero ("NRZ") data can be encoded in several ways. Data can also be encoded using, for example, the well known Miller encoding technique. Alternative encoding includes bi-phase encoding, or encoding so that the encoded bitstream does not incur an accumulated DC value. The latter encoding mechanism is oftentimes referred to as DC-adaptive encoding, and is described in a commonly assigned co-pending application Ser. No. 09/710,220 entitled "An Encoder within a Communication System that Avoids Encoded DC Accumulation and can Use Coding Violations to Synchronize a Decoder and Detect Transmission Errors."

If the frame sync rate (FSR) across transmission line 14 is less than 48 KHz (e.g., FSR could be chosen to match a CD sample rate of 44.1 KHz), then the streaming data from a 48 KHz sampled DVD player cannot be placed synchronously through transmission line 14 to another node (i.e., a speaker). Instead, the streaming data must be placed as isochronous streaming data as opposed to synchronous streaming data).

In addition to streaming data being asynchronous to the transfer rate of transmission line 14, other types of data can also be asynchronous such as, for example, packetized data or control data. In each instance, however, the various data types are fed across transmission line 14 in synchronous fashion. Communication system 10 is therefore a synchronous transmission system which accommodates dissimilar data types sampled at dissimilar frequencies or data types that are placed in non-regular, non-temporal relationship with one another.

Figure 2:
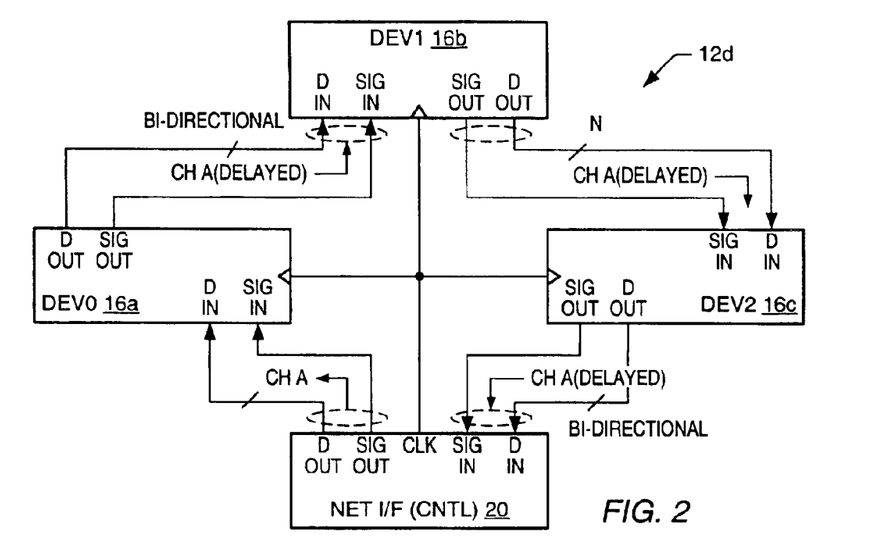
FIG. 2 is a block diagram of the controller and multimedia devices connected in a ring topology, with the controller and each device having a minimum five pin count and wherein the controller and each device is capable of bi-directional communication on a single channel.
Figure 3:
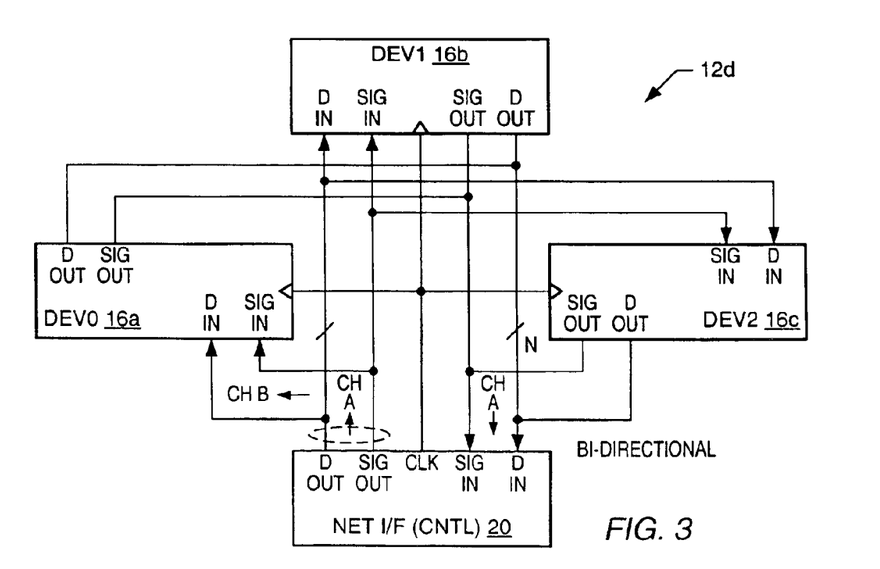
FIG. 3 is a block diagram of the controller and multimedia devices connected in a bus topology, with the controller and each of the devices having a minimum five pin count and wherein the controller is capable of bi-directional communication on a single channel to each device, and each device is capable of uni-directional communication on a single channel to another device.

Referring to FIG. 2, a ring topology is shown for node 12d. In contrast to the ring topology of FIG. 2, FIG. 3 illustrates node 12d having a bus topology. FIGS. 2 and 3 illustrate a physical layer specification for the local bus that connects network interface 20 to multimedia devices 16. In the ring topology, the devices are connected to one another by uni-directional transmission links to form a single closed loop. For example, token ring and FDDI networks implement a ring topology. The bus topology is a linear architecture in which transmission from devices propagate the length of the medium and are received by all other devices. A popular bus topology includes the Ethernet or IEEE 802.3 networks.

FIGS. 2 and 3 are presented to illustrate the relatively few pins needed on each device/controller to effectuate data transfer—whether in a ring topology or a bus topology. If only a single data conductor is used, then only five pins are needed on each device/controller: D_IN, D_OUT, SIG_IN, SIG_OUT, and CLK. The clock signal (CLK) can be mastered from any of the devices yet, preferably, is mastered from the network interface, or controller 20. Thus, controller 20 can also be clock slaved to possibly another clock master within one of the other nodes of the communication system. Controller 20 can, therefore, employ a clock recovery circuit from data sent across the network from another node, and can present the recovered clock to various devices within the local node as shown. Alternatively, controller 20 can utilize a crystal oscillator which not only provides a clock master to other devices within the node, but also possibly other nodes within the communication system.

FIG. 2 illustrates bi-directional communication that can occur on a single channel between the controller 20 and any of the devices 16, as well as between any pair of devices 16. As illustrated, channel A ("CH A") can be sent from controller 20 to a first device 16a and bypassed through device 16a to the destination device (e.g., device 16b). Output from device 16b is simply delayed as it passes through device 16b from the D_IN pin to the D_OUT pin. Channel A can continue around the loop until it is received by the destination—either the controller or another device. Thus, a ring topology allows bi-directional channel transmission between the controller and any device, as well as between any pair of devices.

The bus topology of FIG. 3 can provide bi-directional communication on a single channel between controller 20 and any device 16; however, the bus topology provides only uni-directional communication on a single channel between any pair of devices 16. While channel A can be sent from D_OUT of controller 20 to the destination device and back to the controller via D_IN in a bi-directional communication, a pair of channels is needed if communication occurs between a pair of devices. While device 16b can send channel A output from D_OUT to controller 20, the D_OUT output from controller 20 must send another channel, channel B ("CH B"), to the D_IN input of device 16a; thus, only uni-directional communication occurs between a pair of devices (16a and 16b).

Figure 4:
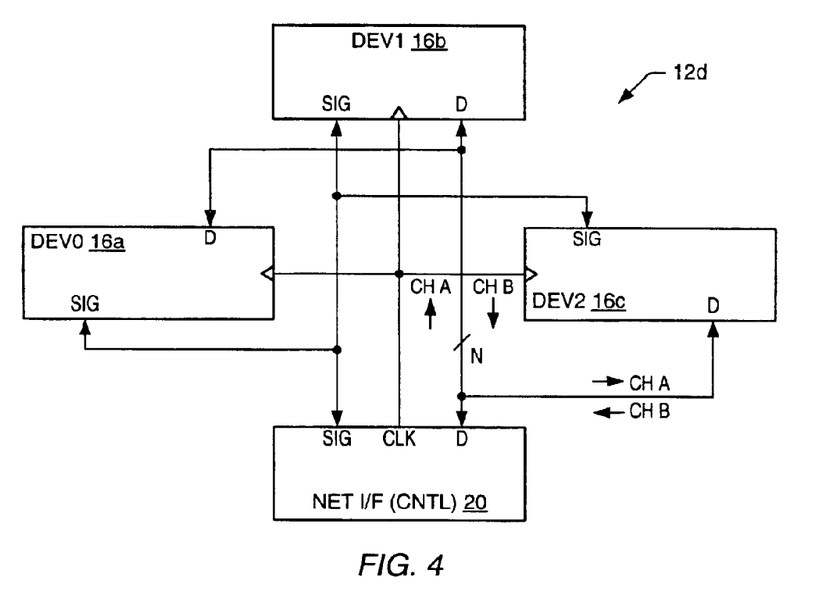
FIG. 4 is a block diagram of the controller and multimedia devices connected in a bus topology, with the controller and each device having a minimum three pins and wherein the controller and each device is capable of uni-directional communication on a single channel.

FIG. 4 illustrates an alternative local bus configuration for node 12d. As opposed to the uni-directional data and signal conductors of FIG. 3, the bus topology of FIG. 4 is shown having bi-directional data and signal conductors. Each device or controller therefore requires a minimum of only three pins: D, SIG and CLK. If more than one data conductor is needed for improved bandwidth, then more than three pins will be needed to accommodate the added data conductors.

An objective of using a network interface is to place the intelligence of the local bus transfer within the interface as opposed to placing such intelligence within the multimedia devices or the network. This allows encapsulation of the network protocol within the network interface unit using reduced pin counts and the ability to reuse legacy multimedia devices. An overall reduction in time-to-market occurs with the added benefit of backward and forward device design compatibility. The network interface allows the local bus to define a standard interface between the network interface and multiple devices, and supports inter-device communication within the node without requiring intervention by the network interface. Regardless of whether the data type is streaming data (isochronous or synchronous), packetized data, or control data, the network interface accommodates all the various types of data placed on a network which is synchronous, yet operates at a dissimilar frame sync rate than the sample rate of the streaming data. The network interface also keeps track of where, within a packet of data, the present frame of data exists. Multiple frames of data can be assured to transmit not only the full streaming data information, but also the full packetized data information.

Figure 5:
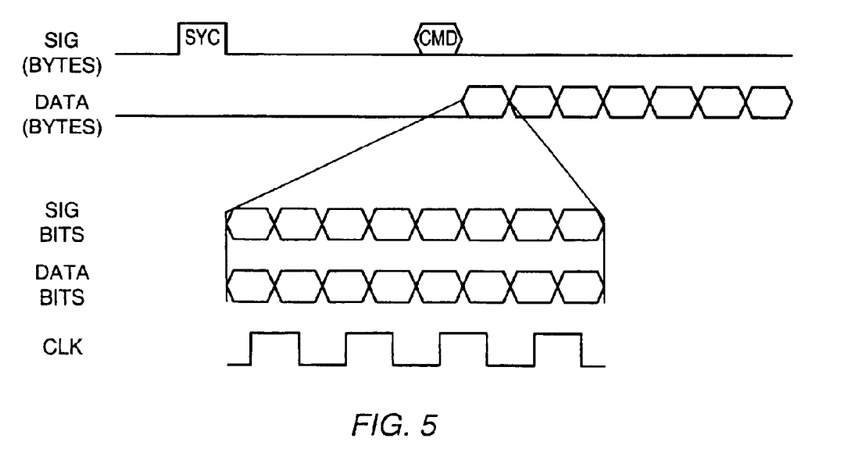
FIG. 5 is timing diagram of a clocking signal sent from a clock master (such as the controller of another node within the network) for synchronizing the transmission control, address and data bits within corresponding bytes sent across the local bus.

Regardless of whether the signal (SIG) and data (D) lines are uni-directional (FIGS. 2 and 3) or bi-directional (FIG. 4), FIG. 5 illustrates that signals placed on the signal line and the data line are synchronized to the clocking signal and, typically, are synchronized to the network. If the clock rate of the local bus is different from the network, streaming data may need to be converted to isochronous data and vice-versa. The signal codes and data codes transition in sync with transitions of the clocking signal. As noted above, the clocking signal emanates from the network or from a crystal oscillator within a node of the network and, therefore, the network interface can be and is, preferably, a fully synchronous interface—i.e., synchronized to the network and the local bus.

The clock rate is preferably equal to the Baud rate of the network. For example, if the network has a frame sync rate of 48 KHz, then the clock rate can be 1024×48 KHz, or 49.152 MHz. This is, of course, assuming 64 bytes per frame with a two-bit encoding.

While the synchronizing clock frequency within the network and the local bus can be, but is not necessarily, approximately 1024 fs, in the example provided, the frequency of the serial clock used to transmit serialized multimedia device information is substantially lower (e.g., 128 fs). This affords, for example, streaming data from a device to be partitioned among successive frames sent across the local bus as well as across the network. For example, 8 bytes of a 64-byte frame can be dedicated to channel A, separate and apart from possibly another 8 bytes of that frame dedicated to channel B, and so forth. Channel A can be used to send isochronous data, for example, and channel B can be used to send packetized data, for example. Thus, within each frame, time slots can be used and allocated to send different types of data.

As shown in FIG. 5, a sync ("SYC") byte is used to demarcate bytes and frames of data. The sync byte occurs at the beginning of each frame. The first time slot within a frame subsequent to a sync byte can be allocated to sending a certain type of data separate and distinct from a subsequent time slot dedicated to a different type of data, and so forth for each time slot of each corresponding frame.

Occurring subsequent to each sync byte can be a command ("CMD") byte. Unlike streaming data which picks up where the last streaming data left off in the previous frame, packetized data does not have a temporal relationship and, therefore, one does not know where, within a packet, the previous frame left off. As such, the command byte signals that the previous packet must be resumed or, if a new packet is ready for transmission, that the start of new packet occurs. The command byte is, therefore, used to signify the beginning of a packet of data sent within a particular time slot or a continuation of a previous packet of data in that time slot. Further details of the command byte will be provided below.

Figure 6:
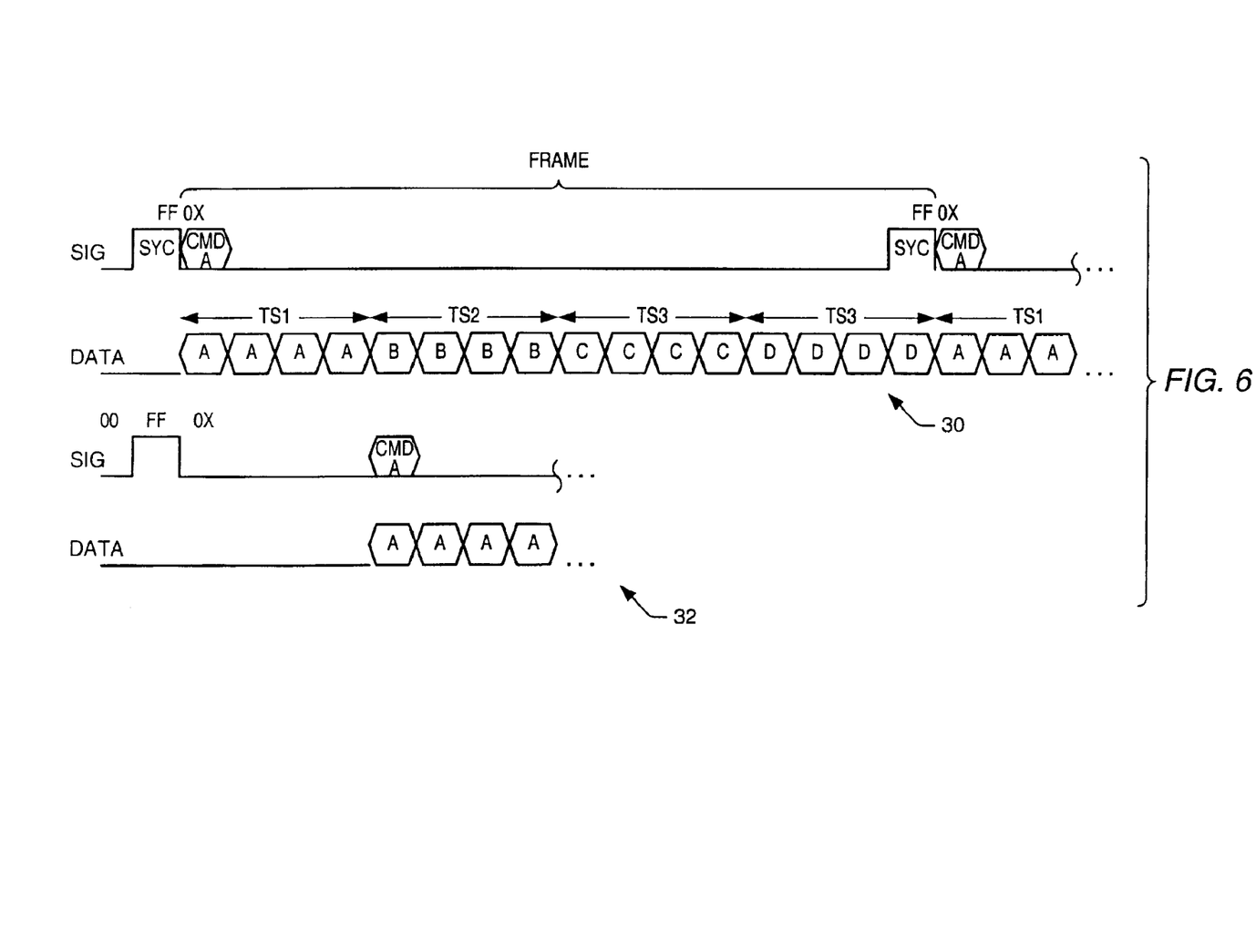
FIG. 6 is a timing diagram of a set of channels time-multiplexed across a frame with one of the channels comprising data signified with a command byte.

FIG. 6 illustrates one example by which four time slots, TS1, TS2, TS3, and TS4, are attributable to each frame. The initiation of time slot partitions within a frame are signaled by a unique code of the sync signal. The sync signal can be an entire byte and, if so, is coded hexadecimal FF which translates to a binary 11111111. A command byte can be placed between successive sync bytes at the beginning of a particular time slot. In the example shown, command A ("CMD A") is placed at the beginning of time slot 1 corresponding to the first byte of data A. If desired, command A can be placed at the beginning of the first time slot or at the beginning of the second time slot, third time slot, etc. If placed at the beginning of the first time slot, then it is noted that a 0XXX XXXX binary code allows for a sync byte to be readily decoded as having eight 1s followed by a 0, where 0 is the MSB of the command byte. Using eight 1s for a sync byte and a 0 in the MSB locations of a command byte affords rapid decoding of the sync byte to indicate data A must be sent by the source device immediately upon receiving from the controller the last 1 in the LSB location. Using a unique bit pattern for the sync byte allows quick detection and demarcation by the source device at frame boundaries.

As shown by timing diagram 30, the data associated with TS 1–4 (i.e., channel A–channel D), is a minimum of 4 bytes long for each time slot or channel. However, it is understood that the minimum channel length can be as short as 1 byte long and that a frame can be fewer than 16 bytes (as shown) or greater than 16 bytes long. Only for ease of illustration and brevity in the drawing, timing diagram 30 shows a 16-byte frame with time slots (or channels), each being 4 bytes long.

Timing diagram 32 illustrates that the command signal (or byte) need not occur within the first byte location of the first time slot. Instead, the command signal can be sent on the signal line coincident with the first byte location of the second time slot or, for that matter, the first byte location of the third, fourth, etc. time slot. A minimum of one command signal is sent per frame if a time slot is to be dedicated to sending packetized data. Timing diagram 32 is merely an example illustrating that the command for the start of a packet or the continuation of a packet can occur at the beginning of the second time slot, instead of the first time slot as in timing diagram 30.

The data transfer protocol of FIG. 6 is applicable to uni-directional or bi-directional data/signal signal lines. Thus, the transfer protocol is applicable to a minimum three-pin device or a five-pin device (see FIGS. 2–4). In a bus topology, after the source device transmits a particular channel, however, the source device must tri-state its output. Outputs are tri-stated so as not to effect the transmission of another device.

A message can be sourced from the network or not from the network (i.e., from a device on the local bus that is not the controller). Regardless, the controller transmits the sync signal on the signal line to set up the time slots and channels for each frame. If a device is transmitting the message, then the device will transmit the command byte designating non-streaming data within a time slot having the command byte. The source device also sends the data bytes in that time slot. If a uni-directional bus is used, then the source device will send command and data on that device's SIG_OUT and DATA_OUT pins to the corresponding SIG_IN and DATA_IN pins of the controller some fixed delay after the pipeline delay on the local bus. If the data and signal lines are bi-directional, then the source device merely sends the command and data on the SIG and D pins to the controller's SIG and D pins.

Figure 7:
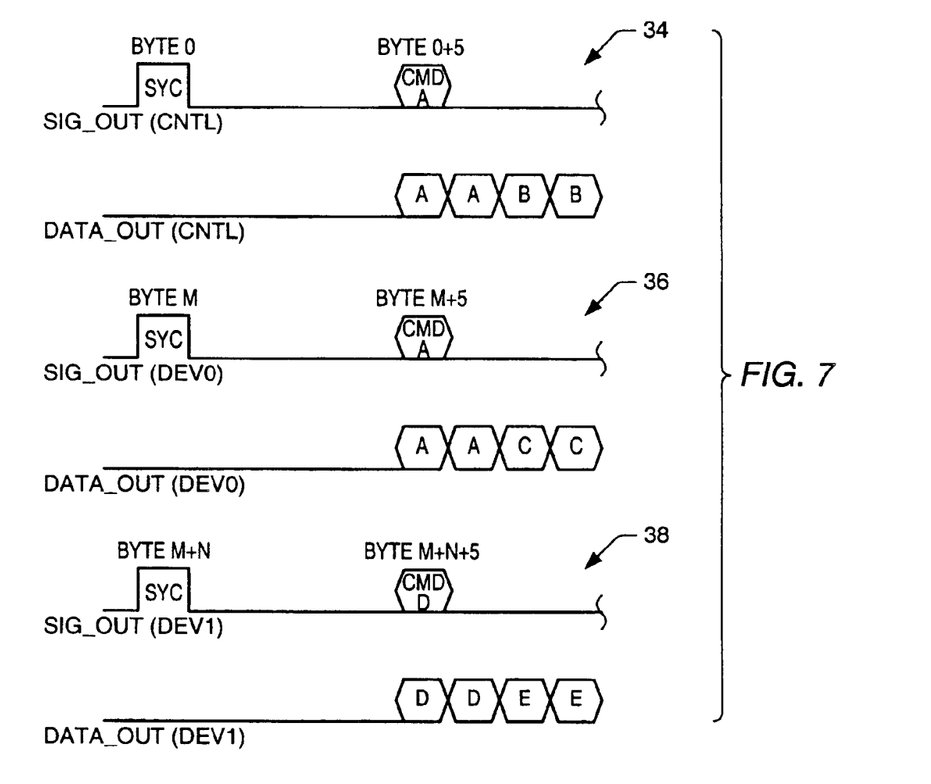
FIG. 7 is a timing diagram of a set of channels forwarded to, through and from corresponding devices connected to one another via a local bus ring topology.

FIG. 7 illustrates data transfer protocol in a ring topology. In particular, FIG. 7 illustrates a timing diagram of a ring topology utilizing uni-directional buses arranged according to the topology of FIG. 2. Data is sent around the ring across a single channel between a controller 20 and any of the devices 16, as well as between pairs of devices 16. Thus, controller 20 can send a sync byte in byte location BYTE0 and, after a pipeline delay, the source device (i.e., the controller in this example) sends a first time slot of data which might be channel A, followed by channel B, etc., the pipeline delay might be 4 bytes in length, as shown in the example of timing diagram labeled 34. However, the pipeline could be more or less than 4 bytes. Along with SIG_OUT sent from the controller source, DATA_OUT is sent corresponding to the various time slots within the frame initialized at byte location BYTE0.

After some time delay within device 0, noted as M, the sync byte is retransmitted by device 0. The process of forwarding a channel about the ring will continue, taking into account various delays within certain devices. It is noted that the timing diagram of the SIG_OUT and DATA_OUT pins of device 0, labeled 36, can accommodate data altogether different from the data sent from the controller, as indicated by timing diagram 36. Thus, the controller can send multiple channels from its DATA_OUT pin, and each device can also send multiple channels of different data from their DATA_OUT pins. The channels are merely passageways through which particular types of data are sent.

Timing diagram 38 indicates that the data of channel A may be destined for device 1, yet device 1 sends new data within the first time slot other than data of channel A—i.e., the new data being DATA D. Thus, timing diagram 38 indicates another delay of N. In fact, device 1 produces channel D and E having different data in time slots 0 and 1. Therefore, timing diagram 34 illustrates communication from the controller; timing diagram 36 illustrates communication from device 1; and timing diagram 38 indicates communication from device 2. While command A may indicate a start of packet command, command D may indicate a continuation of packet command. Thus, data A might be packetized data and, particularly, the beginning of the packetized data, while data D may also be packetized data.

In the example shown in FIG. 7, data A is non-streaming data transmitted by the controller to the first device within the ring. It is appreciated, upon reviewing timing diagrams 34, 36, and 38, that in a uni-directional local bus architecture, the output from the SIG_OUT and DATA_OUT pins of a given device or controller are apportioned into channels according to time slots, with a particular data type applied to each time slot within each frame. Data within a channel of a particular time slot not used by a device can be retransmitted to the subsequent device on the ring.

During initialization, the controller and devices either must know in firmware which time slots to assign to the control channels, isochronous channels, synchronous channels, and packetized channels sent from the various devices or controller, or the controller must write this information into each device using the sync and broadcast channels. In response to a broadcast messages, the controller will then know how many devices are connected and the address of each channel. The controller can then send messages embedding each channel address into the message to each device to specify which time slots to use. Once this information is loaded into each device, the controller can then read from each device. If a ring topology is used, the last device in the ring from the controller can communicate back to the controller on the sync and broadcast channels.

Figure 8:
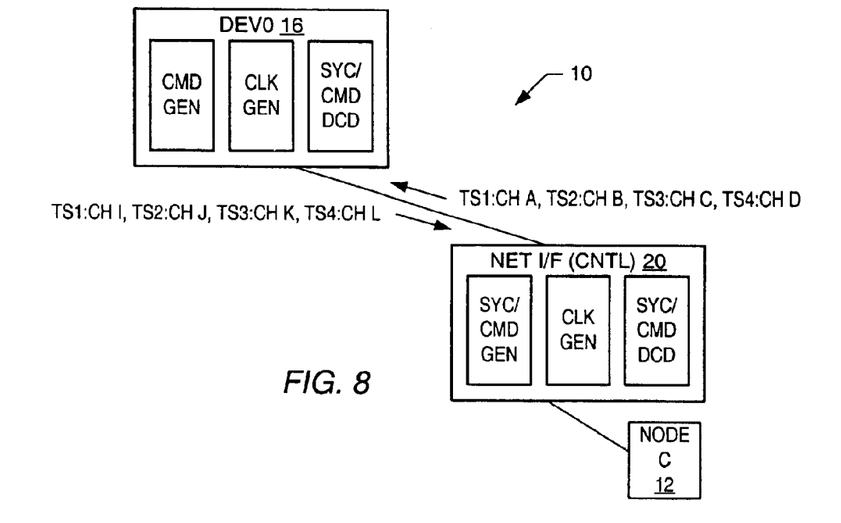
FIG. 8 is a block diagram of the channels formed between a device and the controller, and the time sequence used to establish channels for communication between the device and the controller whereby a channel can convey a respective type of data dissimilar from one or more of the other channels according to the example of FIG. 6.

FIG. 8 illustrates communication system 10 and, particularly, network interface 20 linked between a network having node 12 and a local bus having a multimedia device 16. Time slots 1–4 are illustrative of channels A–D sent from network interface to device 16. One or more of the channels forwarded within the frame may require a command byte sent within a signal line. Accordingly, controller 20 can be a source and device 16 can be a destination. Conversely, device 16 can be a source and network controller 20 can be a destination if channel I–L are forwarded, as shown.

The network and local bus are synchronized with a clock, generated either by controller 20 or device 16. Sync byte is generated from controller 20 and command bytes can be sent from the source device, such as controller 20 or device 16. It is important that the destination device (whether destination device is device 16 or controller 20) receive and decode the sync byte and command byte to know where the bytes and frames begin. Since each time slot is pre-defined, the sync byte essentially operates as a byte-to-byte synchronizer. The command byte is also synchronized to the sync byte.

Figure 9:
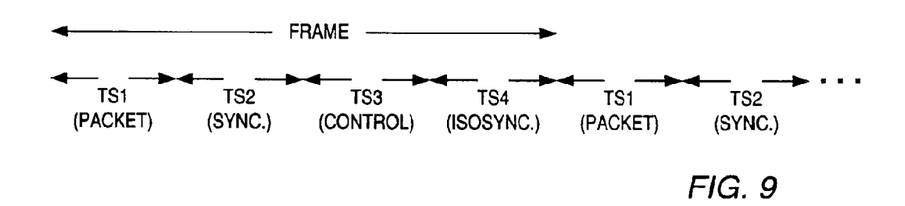
FIG. 9 is a timing diagram showing multiple types of data sent across possibly four channels within a frame, with the frame repeating every sync signal forwarded across the signal conductor.

FIG. 9 illustrates the various data types that can be sent within the frame and apportioned to various time slots: TS1–TS4. While the example shows four time slots, it is important to note that each frame can be apportioned into more than four time slots or less than four time slots depending on the number of data types being sent within a frame, the frame size, the channel length, and so forth. For example, two time slots can be attributed to synchronous data and less than one time slot can be attributed to packetized data if, indeed, TCP/IP data is not destined for the local bus and more streaming data is present.

Figure 10:
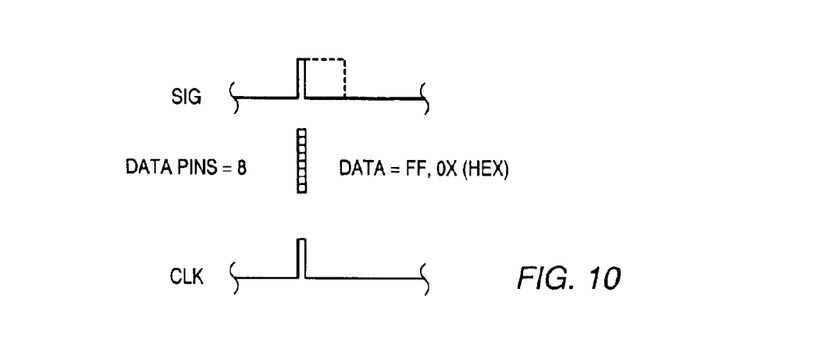
FIG. 10 is a timing diagram of placing a code on the data line synchronized to a sync pulse to signify the beginning of a channel address or frame initiation rather than placing the code upon the signal line as an entire byte in order to lessen signal line bandwidth requirements.

FIG. 10 illustrates an option by which the sync byte or command byte can be represented as a single bit pulse. If the number of data pins is equal to 8, then 8 bits can be sent at the same time in which a single signal pulse is sent. The 8 data lines can be encoded in any fashion to signify frame boundaries. The single sync pulse is thereby used to signify byte boundaries. The eight data lines, therefore, do not need to be coded as FF hex with the next bit being a 0. This allows the data pins to signify the sync byte and/or the command byte synchronized to a single signal pulse, all achievable within a single clock cycle within the local bus.

If the data pins are equal to 4, rather than 8, then a pulse two clocks wide is needed to forward the encoded sync and command bytes and, if the number of data pins are 2, then a pulse four clocks wide is needed. This method enables smaller channels to be used than the normal approach. With eight data lines and 2 bytes on the signal line for address and command, the minimum addressable channel is 16 bytes with the normal approach. With this alternative approach, with any number of data lines, the minimum channel is 2 bytes.

The physical layer specification for the local bus is shown implemented as bi-directional and uni-directional conductors. Optimally, a bi-directional bus is used to minimize pin count for each device and controller. While conventional serial buses can be used to support multiple data stream or data types, the I$^2$S bus defined by Phillips Corporation and the Audio Codec bus defined by Intel Corporation typically require an additional port on the controller to accommodate additional devices. This will significantly enhance the pin count on the controller and the overall complexity of the bus and ring topology. Using time slots and a local bus with minimal pin count per device and controller is, therefore, advantageous since, in fact, many digital signal processors are able to implement ring communication on-chip.

While the local bus clock synchronizes command, sync, and data transfers across the local bus, it is recognized that the local clock can be variable. Moreover, the local clock may be and is, preferably, synchronized to the network clock. The data throughput of the local bus is, however, scalable depending upon the number of data lines used. If only a single data line is used, then the data throughput can be, for example, 1024 fs (i.e., 49.152 MHz at 48 KHz network frequency) if a 1024 fs clock is used. However, if 8 pins are used, then instead of a 49.152 Mbps, data throughput of the local bus can be 49.152 Mbps×8, or 393.216 Mbps, for example.

The pipeline delay is at least one channel length and can be multiples of one channel length, the minimum channel length being 2 bytes. The reserved channel address of hexadecimal FF will be used by the controller as a broadcast channel to periodically sync the time slots. It is desired that the broadcast channel occur once for each frame.

Figure 11:
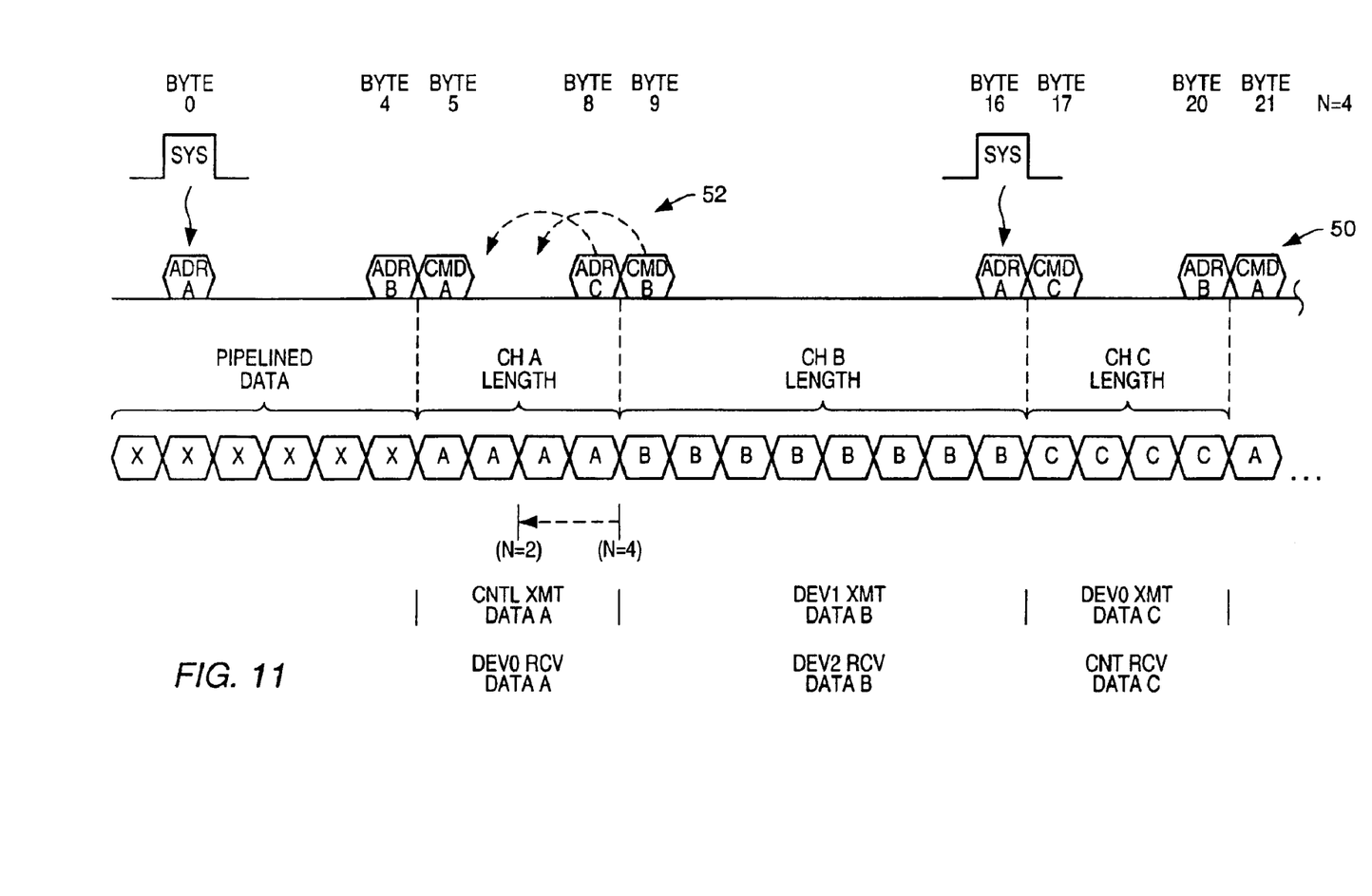
FIG. 11 is a timing diagram of channels established upon the local bus, wherein each channel is established by an addressing signal sent on a signal conductor, and wherein a unique data type can be established by a command signal also sent on the signal conductor.
Figure 12:
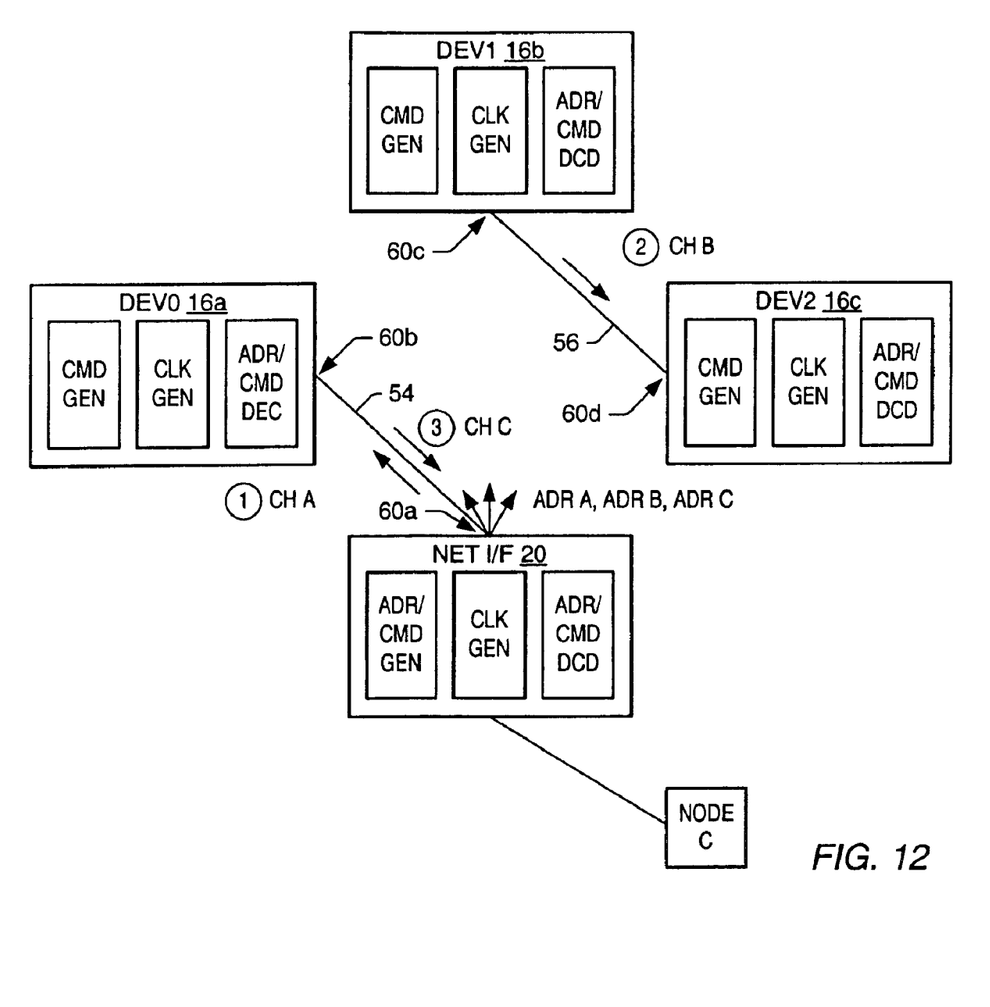
FIG. 12 is a block diagram of the channels formed between the controller and a multimedia device as well as between multimedia devices, and the timing of data subsequently sent across those channels in accordance with the address and control protocol example shown in FIG. 11.
Figure 13:
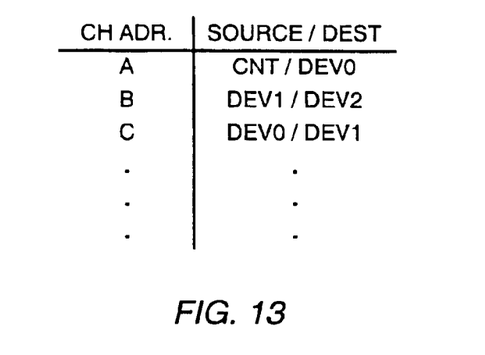
FIG. 13 is a table of channel addresses and corresponding sources and destinations for each channel address in the example shown in FIGS. 11 and 12.

FIGS. 11–13 illustrate an alternative embodiment from that described in FIGS. 6–10. Using the second embodiment, regimented time slots need not be used and, in lieu of time slots, an addressing protocol can be established to form the corresponding channels. Thus, FIGS. 11–13 illustrate the benefit of not being tied to sending a particular data type within a first time slot and another data type within a second time slot across multiple frames being transmitted. The added flexibility of being able to designate a particular data type based on an addressing protocol, rather than in a fixed time slot location, allows data to be transferred possibly more efficiently provided, of course, a channel is established to send streaming data for each frame during times in which the streaming data is being sampled in real time. Non-streaming data, such as packetized or control data, need not be sent in each and every frame. This allows multimedia device transfers which operate predominantly on streaming data to allocate more channels within a frame to sending such data without having to be burdened by allocating time slots for packetized data when no packets are available for transmission.

Using an addressing protocol, which will be described below, provides the best data transfer performance and bandwidth allocation. Channel addressing and data transfer protocol described in FIGS. 11–13 can be used with bi-directional conductors or uni-directional conductors of the local bus, in a bus topology or a ring topology, similar to time slot allocation. Other than for flexibility of transferring a data type on a channel-by-channel basis, all other features of time slot allocation are also present within the channel addressing embodiment hereof.

Turning now to FIG. 11, a timing diagram 50 is shown illustrating dynamic channel assignment and resource allocation. A sync signal is forwarded across the signal conductor from the controller as a broadcast address A, in the example of FIG. 11. Address A is shown forwarded from the controller as the broadcast channel. Assuming timing diagram 50 does not depict initialization, then data will be present from the previously addressed channel upon the data conductors. That data is known as the pipeline data, indicated with a number "X" bytes. The pipeline duration is one channel in length and can vary from frame to frame. In the timing diagram 50 example, the pipeline byte width is 4 bytes.

Once the controller asserts the next address (i.e., address B), the source device knows to terminate its transmission, and the previously addressed source device will send a command signal (i.e., command A). The command signal indicates the type of data being sent within a channel established by the previous address A (i.e., broadcast channel A). Channel A will continue for a duration determined by the next address asserted by the controller (i.e., address C). Similar to address B, address C is broadcast by the controller to each of the devices and the source device which transmits channel A will know to terminate its transfer in readiness for the next channel established by the preceding address B (i.e., channel B).

The procedure by which addresses and commands are sent on a signal line and data is sent on one or more data lines, is coordinated by the intelligent controller. That is, the controller will establish through the address the source device and the destination device (which can include the controller itself). The controller will also establish the duration of a channel as the number of bytes between a subsequent pair of addresses. A controller can, for example, send a minimum channel length between a pair of devices by asserting the next address early, or delaying the next address to send possibly a channel length which is a multiple of the minimum channel length. The added flexibility of sending more data of a particular type becomes prevalent if, however, a long duration of streaming data occurs on the network which must be forwarded to its destination on a local bus via a controller. The same can be said if a long duration of packetized data exists in a lengthy burst. Provided, of course, allocation is made in a frame to transmit streaming data (if present), the packetized data could extend multiples of the minimum channel length.

The controller has sufficient intelligence to know when various types of data are present and must be transferred. In particular, the controller knows that streaming data must be transferred in real time and, thereby, reserves one or more channels within each frame for sending isochronous streaming data and/or synchronous streaming data.

FIG. 11 illustrates a frame width of 16 bytes. The first channel extends from the previous frame as pipeline data, followed by channel A having a 4 byte width, and followed by channel B having an 8 byte width. The frame can also be thought of as possibly beginning on byte 4 and ending on byte 20, whereby the first channel established in that frame is channel A, followed by channel B, and finally channel C. The minimum channel length is at least 2 (i.e., N represents the channel length and N is shown in FIG. 11 as equal to 4). However, if address C and command B are moved up 2 byte lengths, then channel A length would only be 2 bytes long before address C occurs and command B is initiated. Reference 52 illustrates the formation of a minimum channel length of N=2, rather than N=4.

FIG. 11 also illustrates that the various channels are established for transmitting a certain length of data from a unique source to a unique destination. For example, the data in channel A can be transmitted from a controller source to a device 0, whereas data in channel B is sent from device 1 to device 2, and data in channel C is shown to be sent from device 0 to the controller. Further details of how channels are established and the effect of those channels as transmission paths are provided in FIG. 12.

FIG. 12 illustrates communication pathways 54 and 56 established within a local bus. The pathways are established through communication ports 60 found on the network interface and/or one or more of the multimedia devices. The communication port on the controller transmits sync and addressing signals, and the communication port on the devices (absent a controller) transmits primarily command signals. The local bus can be any type of topology, including a bus topology or a ring topology. Channel A is established by broadcasting an address ("ADR A") from controller 20 to each of the devices linked to the local bus. After a pipeline delay, controller 20 then forwards address B ("ADR B") to each of the devices. Transmission of address B indicates that the previous data transmission must be terminated and the source device for address A must begin its transmission by sending command A to the destination device. In this case, the source device is controller 20 which sends command A and the ensuing data within channel A to the addressed destination device 0. Channel A is maintained until controller 20 sends the next address which, using this example, is address C broadcast to each of the devices. Upon receiving address C, the source device which received address B sends its command signal to initiate channel B from source device 1 to destination device 2. Channel B is discontinued with the broadcast of the next address, which is address A sent from controller 20, followed by command C of the source device of that address. In this example, the source device is device 0 which sends data within channel C to controller 20.

The above example used to illustrate the data transfer protocol is merely an example of possibly numerous permutations depending on numerous factors. For example, there could be more than three devices and, certainly, more than or fewer than three channels having a minimum channel length of 2 bytes, 4 bytes, or each channel having a duration exceeding one minimum channel length, for example.

FIG. 13 illustrates, using the example of FIGS. 11–12, addresses for channel addresses A, B, and C. Thus address A can designate the controller as the source and device 0 as the destination, whereas address B can designate device 1 as the source and device 2 as the destination, and so forth. Each address defines a unique source and destination pair and the duration of the data transfer is the time difference between addresses. Moreover, the type of data being transferred is designated by the command.

Figure 14:
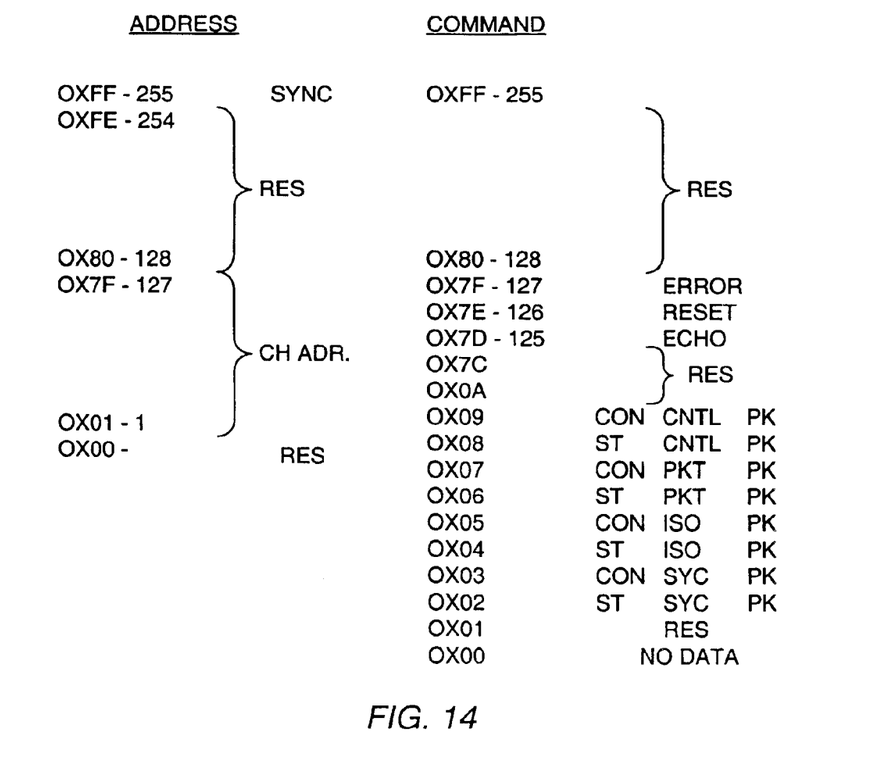
FIG. 14 is a table of a plurality of channel addresses that are set aside and usable by the controller to establish unique channels across the local bus and a plurality of commands that can be sent by the controller or a device applicable to initializing addressing, to notify the destination device of an error in transmission, to notify the destination device of no data within a channel, and/or to notify the destination device that the data being transmitted across a channel is of a certain type.

An exemplary address and command descriptor tables are shown in FIG. 14. The channel addresses are 8-bit addresses with hexadecimal FF reserved to be the sync pattern and broadcast address. In order to guarantee there are no occurrence of the sync pattern, address hexadecimal 80 to hexadecimal FE are reserved also. Therefore, there are 127 unique channel addresses available to be used by an application on the local bus. A command is also a byte, with hexadecimal 80 to hexadecimal FF reserved to guarantee that there will be no occurrence of the sync pattern. In addition, the MSB of the command will always be 0 and can be used as an error detection scheme. The command structure allows the local bus devices to indicate the type of data being placed on the local bus. All the various data types are supported from decimal 1–9 to note that control data, packet data, isochronous data, and synchronous data can be labeled as a start or continuation command depending on whether the present channel is sending the first byte of those data types, or is sending a continuation byte of those data types.

Thus, addresses are tokens which are presented on the signal line by the controller to notify the transmit device and the receive device that the local bus is free and ready for the addressed channel. A command is a token response by the source device to notify the destination device of the data type and other control information, such as ERROR, RESET, ECHO, and NO DATA. Both the controller and the destination device are required to examine the command sent by the source device. The controller will examine the command to monitor for an ERROR code or a NO DATA code. Upon receiving the error code or no data code, the controller will terminate the transfer and no further bandwidth will be wasted. Upon receiving either the ERROR code or NO DATA code, the destination device will ignore the data received. At the time in which the source device responds to the address byte on the signal line, the source device also drives the data on the data line synchronously to the local bus clock. The destination device will clock in the data on the local bus data line synchronously. The message is complete by the controller sending the next channel address on the signal line. The source device will stop transmitting and tri-state the data line immediately after the change of channel address (for a bus topology) is detected and the destination device will stop clocking in the data at the same time.

The sync pattern of hexadecimal FF can be used not only to sync frame boundaries, but also byte boundaries and is used as a broadcast channel for the controller so that information such as channel address table or time slots can be updated by using the broadcast channel periodically.

Numerous variations and modifications will become apparent to those skilled in the art once the above disclosure is fully appreciated. It is intended that the following claims be interpreted to embrace all such variations and modifications.

What is claimed is:

1. A port, comprising a plurality of addresses sent or received by the port, each of which specifics a unique channel comprising a source and a destination for a data transfer, wherein the number of bytes between a pair of addresses specifies a data transfer byte length for a channel addressed with an address prior to the pair of addresses.

2. The port as recited in claim 1, wherein the address prior to the pair of addresses specifics the source and destination for the data transfer.

3. The port as recited in claim 1, wherein the address prior to the pair of addresses is at least two bytes prior to the first address of the pair of addresses.

4. The port as recited in claim 1, wherein the number of bytes between the pair of addresses is at least two bytes.

5. The port as recited in claim 1, wherein each of the plurality of addresses comprises a byte having a logic low voltage value in a most significant bit location of the byte.

6. The port as recited in claim 1, wherein the port is on a monolithic substrate.

7. The port as recited in claim 1, wherein the port is embodied on a network interface configured between a bus and a network.

8. The port as recited in claim 1, wherein the port is embodied upon a multimedia device.

9. A communication system, comprising:
a network interface, comprising:
a signal pin adapted to send a first address, followed by a second address, and followed by a third address;
a multimedia device, comprising:
a data pin adapted to send data from a source to a destination designated by the first address for a time duration between when the signal pin sends the second address and the third address.

10. The communication system as recited in claim 9, wherein the network interface further comprises a clock pin adapted to send a clock, and wherein the first, second and third addresses as well as the data from the source to the destination are synchronized to the clock.

11. The communication system as recited in claim 9, wherein the multimedia device further comprises a signal pin in communication with the signal pin of the network interface for sending a command between the second address and the third address to specify the type of data sent in accordance with the first address.

12. A network interfaced, comprising:
a clock pin;
a signal pin adapted to send a first address, followed by a second address, and followed by a third address; and
a data pin adapted to send data from a source to a destination designated by the first address for a time duration between when the signal pin sends the second address and the third address.

13. The network interface as recited in claim 12, wherein the time duration occurs after the second address ends and before the third address begins.

14. The network interface as recited in claim 12, wherein the clock pin is adapted to send a clock, and wherein the first address, second address, third address and data are synchronized to the clock.

15. The network interface as recited in claim 14, wherein the time duration begins at a cycle of the clock immediately after the second address ends and the time duration ends at a cycle of the clock immediately before the third address begins.

16. The network interface as recited in claim 12, wherein the signal pin is further adapted to send a command between the first address and the second address for specifying the type of data designated by the first address.

17. The network interface as recited in claim 12, wherein the signal pin is further adapted to send a command between the second address and the third address for specifying the type of data designated by the first address.

18. The network interface as recited in claim 12, wherein the signal pin is further adapted to send a command specifying the type of data designated by the first address.

19. The network interface as recited in claim 18, wherein the type of data consists of packets of data sent from a multimedia player at a transfer rate dissimilar to the transfer rate of the data.

20. The network interface as recited in claim 18, wherein the type of data consists of data streaming from the network onto the network interface at a transfer rate equal to the a transfer rate of the data.

21. The network interface as recited in claim 18, wherein the type of data consists of data streaming from a multimedia player at a transfer rate equal to the transfer rate or the data.

22. The network interface as recited in claim 18, wherein the type of data consists of packets of data sent from the network onto the network interface at a transfer rate dissimilar from to the a transfer rate of the data.

23. The network interface as recited in claim 12, wherein the first, second and third addresses are each one byte in length with a logic low voltage value at the most significant bit location.

24. The network interface as recited in claim 12, wherein the data sent from the data pin comprising at least a portion of a frame that is synchronized with a sync byte at the beginning of the frame comprising eight logic high voltage values.

25. A method for transmitting information, comprising:
    transmitting a first address;
    transmitting a second address;
    transmitting data from a source to a destination specified by the first address; and
    transmitting a third address thereupon terminating transmission of the data.

* * * * *

UNITED STATES PATENT AND TRADEMARK OFFICE
CERTIFICATE OF CORRECTION

PATENT NO. : 6,922,747 B2
DATED : July 26, 2005
INVENTOR(S) : Ho

It is certified that error appears in the above-identified patent and that said Letters Patent is hereby corrected as shown below:

Column 17,
Line 22, delete "or" and substitute -- of --.

Column 18,
Line 10, delete "comprising" and substitute -- comprises --.

Signed and Sealed this

Fourteenth Day of March, 2006

JON W. DUDAS
*Director of the United States Patent and Trademark Office*